UNITED STATES PATENT OFFICE.

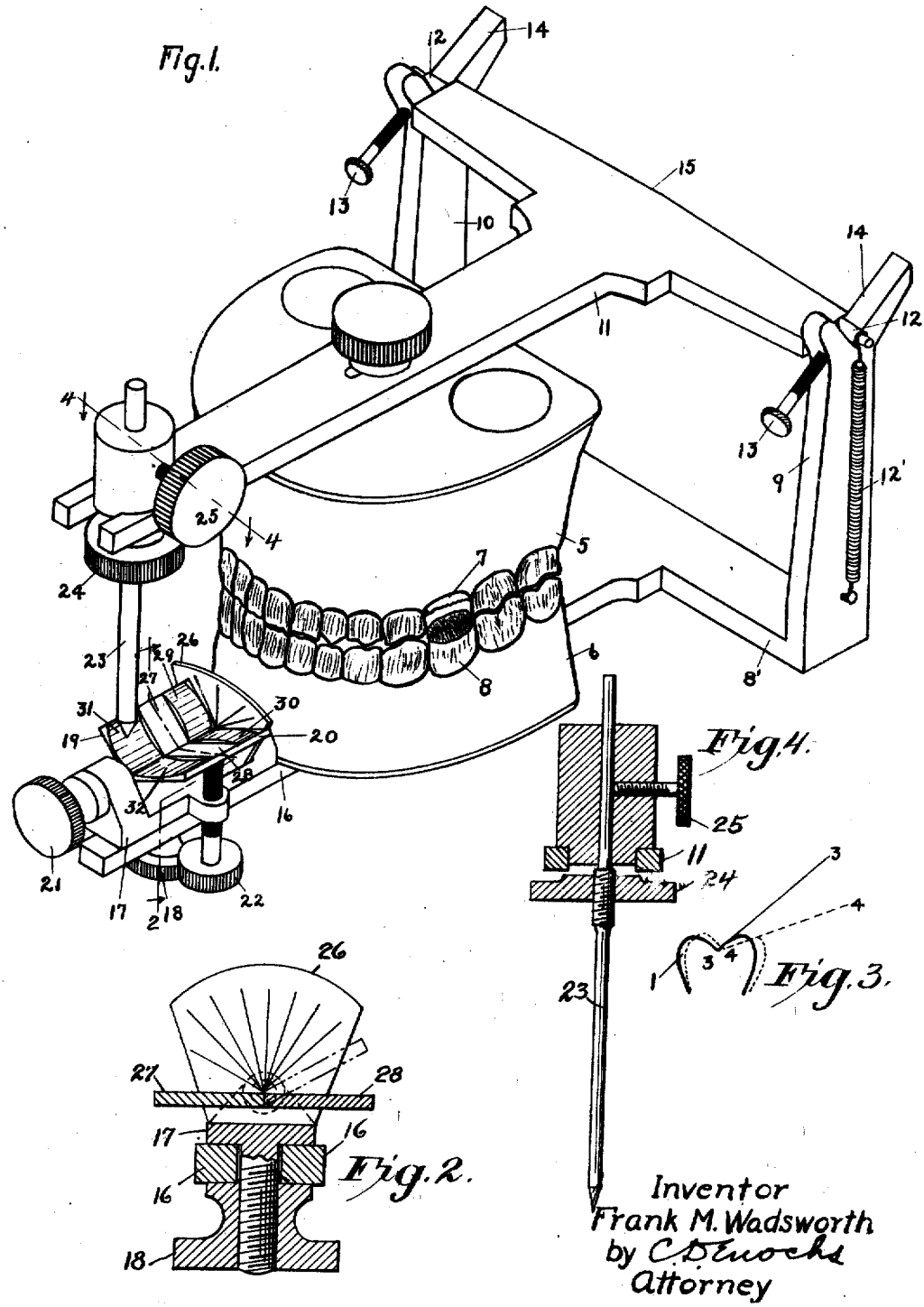

FRANK M. WADSWORTH, OF MINNEAPOLIS, MINNESOTA.

DENTAL DEVICE AND METHOD OF DENTURE CONSTRUCTION.

1,319,737.   Specification of Letters Patent.   Patented Oct. 28, 1919.

Application filed February 15, 1918. Serial No. 217,464.

*To all whom it may concern:*

Be it known that I, FRANK M. WADSWORTH, a citizen of the United States, and a resident of Minneapolis, in the county of Hennepin and State of Minnesota, have invented certain new and useful Improvements in Dental Devices and Methods of Denture Construction, of which the following is a specification.

The main object of my invention is to provide in a dental device, means for establishing the cusp planes in partial dentures.

Another object of my invention is to provide means for reproducing the action of the temporal mandibular articulation.

Another object of my invention is to provide adjustment means for the parts of the device representing the temporal mandibular articulation.

With these and incidental objects in view the invention consists of certain novel features of construction and combination of parts, the essential elements of which are hereinafter described with reference to the drawing which accompanies and forms a part of this specification.

In the drawing Figure 1 is an isometric view of my improved dental device, carrying thereon the reproduction of a set of teeth; Fig. 2 is a section taken on the line 2—2, Fig. 1, and Fig. 3 is a section of one of the teeth to illustrate the position of the cusp plane.

In Fig. 3 the tooth 1 is shown in full lines, as it would normally be set in a human jaw, and the line 3—3 represents what I term the cusp planes; that is, the plane representing the surface of one of the cusps. Fig. 4 is a section taken on the line 4—4, Fig. 1.

Through the natural wear of teeth during life, the cusp planes become distorted, and particularly, when a tooth is extracted the adjacent tooth will tend to move from its original position, as, for instance, to the position shown dotted in Fig. 3, when the cusp plane will then be along the line 4—4 instead of the line 3—3.

When replacing the extracted tooth by a porcelain tooth, in any manner, the cusp plane of the porcelain tooth should be ground to coincide with the cusp plane of the opposing tooth, or the adjacent teeth as the proper joining of the cusp planes of the opposing teeth determine the cutting and grinding capacity of the individual tooth.

In replacing the extracted teeth I therefore reproduce the teeth in the casts 5 and 6 in the ordinary manner, the tooth 7 in this case being the one to be replaced and the tooth 8 being the opposing tooth whose cusp plane is to be established in order to reproduce a co-acting plane in the porcelain tooth at 7.

A frame 8', having two uprights 9 and 10, carries a T-shaped bar 11 having slidable trunnions 12 resting on the uprights 9 and 10.

A spring 12', connecting the trunnion with the frame, restrains its vertical movement, a similar spring, not shown, restraining the vertical movement of the opposite trunnion.

Adjustment screws 13 provide means for adjusting the trunnions 12 on the angle of the members 14.

This sliding action along the members 14 reproduces the action of the temporal mandibular articulation of a human being, so that by adjusting the screws 13 it is possible to reproduce all positions of the teeth in the casts 5 and 6 that could be produced by the action of the jaws.

It is to be noted here that in the human jaw and in my device a sidewise movement of the jaw is produced, not by swinging it about the centrally located point, such as 15, but by movement of one or both of the joints formed of glenoid fossæ of the temporal bone and the condyloid process of the mandibular, hence an adjustment to reproduce the action of the human jaw must provide adjustments on the two sides individually and not an adjustment around a central point such as 15.

The frame member 8' carries a forward forked extension 16 on which is slidably mounted a table 17 whose longitudinal position on the forked extension may be adjusted by loosening the thumb screw 18.

Hinged in the table 17 are two individual leaves 19 and 20, the thumb screw 21 being provided to tighten the hinged action of the leaves.

A thumb screw 22 and a similar thumb screw on the other side, not shown, provide means for limiting the downward motion of each leaf so that when one of the leaves has been set and the thumb screw 22 brought into contact with the lower surface thereof, the position of the leaf is permanently established for the test.

The T-shaped member 11 carries in it forward forked end a gage point 23 normally positioned in the vertical plane of the horizontal hinged joint of the leaves 19 and 20.

Thumb nuts and screws 24 and 25 provide means for adjusting the gage point 23.

With the thumb screw 22 retracted and the porcelain tooth fitted against the opposing tooth 8, the action of the temporal mandibular articulation is reproduced by swinging one of the trunnions 12 upwardly along its incline 14, the gage point 23 riding along one of the leaves and swinging that leaf into a plane corresponding to that of the cusp plane of the opposing tooth 8 or the adjacent teeth.

If the cusp plane of the porcelain tooth does not properly fit the cusp plane of the opposing tooth, it is then ground away slightly and replaced in the cast, and the test repeated until the cusp plane of the porcelain tooth has been ground to fit the cusp plane of the opposing tooth and the adjacent teeth during the reproducing action of the temporal mandibular articulation.

The action is similarly tested on the opposite cusp plane by adjusting the opposite leaf, and the quadrant 26 is preferably marked in degrees to facilitate the grinding of the porcelain tooth to bring its cusp planes to the proper angles.

Looking at the leaves 19 and 20, it will be seen that the central portion of each leaf has its upper surface lying in planes 27 and 28, while on one end the surfaces 29 and 30 are convex, whereas on the other end the surfaces 31 and 32 are concave. This construction provides means for following with the pointer 23 either a plane surface, a convex surface, or a concave surface, depending upon whether the pointer 23 is positioned so as to rest on the plane, convex, or concave surface.

While I am aware that dental devices have been made for the purpose of fitting teeth, I believe myself to be the first to produce any means for establishing the cusp plane of a tooth for the purpose of fitting a porcelain tooth in a partial denture, and shall claim this point broadly, together with incidental adjusting devices.

Therefore, while I have described my invention and illustrated it in one particular design, I do not wish it understood that I limit myself to this construction, as it is evident that the application of the invention may be varied in many ways within the scope of the following claims.

Claims:

1. The method of partial denture comprising the establishment of the cusp plane of a natural tooth and fitting an artificial tooth to said cusp plane.

2. In a dental device the combination of means for carrying in movable relation a reproduction of a set of teeth, an adjustable leaf associated therewith for registering the path of movement of said set of teeth, a part of said leaf having a concave surface thereon.

3. In a dental device the combination of means for carrying in movable relation a reproduction of a set of teeth, an adjustable leaf associated therewith, a part of said leaf having a convex surface.

4. In a dental device the combination of means for carrying in movable relation a reproduction of a set of teeth, two adjustable leaves associated therewith, a part of one of said leaves having a concave surface, one part having a convex surface, and one part having a plane surface.

5. In a dental device the combination of means for determining the angles of the cusp planes of the natural teeth, indicating means on said device positioned perpendicularly to said first named means for registering said angles, and locking means on said device for locking said registering means so it may be used in grinding cusp planes of artificial teeth to correspond with those of the natural teeth.

6. In a dental device a leaf support for a gage point rotatable vertically in the device, said leaf having its axis of rotation in the same plane as its upper surface.

7. In a dental device a leaf support for a gage point rotatable vertically in the device, said leaf having its axis of rotation in the same plane as its upper surface, and a graduated scale to show the angle of said leaf, positioned perpendicular to the axis of rotation of said leaf support.

8. In a dental device a leaf support for a gage point rotatable vertically in the device, said leaf having its axis of rotation in the same plane as its upper surface, and a locking device to positively position said leaf.

FRANK M. WADSWORTH.